United States Patent
Worden et al.

(10) Patent No.: US 7,036,206 B2
(45) Date of Patent: May 2, 2006

(54) PROCESS FOR PREPARING AN OVER MOLDED MOTOR STATOR STRUCTURE

(75) Inventors: Eric P. Worden, Frankenmuth, MI (US); Jeffrey Jean Stege, Linden, MI (US); Edward V. Krejci, Byron, MI (US); Mark J. Hilderbrant, Linden, MI (US); Thomas Wayne Newman, Flint, MI (US); Dave C. Thibo, Fenton, MI (US); Brian T. Sanders, Burton, MI (US)

(73) Assignee: Delphi Technologies, Inc., Troy, MI (US)

( * ) Notice: Subject to any disclaimer, the term of this patent is extended or adjusted under 35 U.S.C. 154(b) by 445 days.

(21) Appl. No.: 10/632,510

(22) Filed: Aug. 1, 2003

(65) Prior Publication Data

US 2004/0056383 A1    Mar. 25, 2004

Related U.S. Application Data

(60) Provisional application No. 60/402,457, filed on Aug. 9, 2002, provisional application No. 60/402,221, filed on Aug. 9, 2002.

(51) Int. Cl.
*H02K 15/02* (2006.01)

(52) U.S. Cl. ............... 29/596; 264/272.19; 264/272.2; 310/43; 310/216; 310/261; 29/598

(58) Field of Classification Search ............... 29/596, 29/598; 264/272.19, 272.2, 272.11; 310/43, 310/216, 261, 253, 259
See application file for complete search history.

(56) References Cited

U.S. PATENT DOCUMENTS

| | | | |
|---|---|---|---|
| 5,389,844 A * | 2/1995 | Yarr et al. ................... 310/15 |
| 5,490,319 A * | 2/1996 | Nakamura et al. ............ 29/596 |
| 5,597,523 A * | 1/1997 | Sakai et al. .................. 264/219 |
| 5,806,169 A * | 9/1998 | Trago et al. .................. 29/596 |
| 5,918,360 A * | 7/1999 | Forbes et al. ................. 29/596 |
| 6,002,185 A | 12/1999 | Nakao et al. ................. 310/43 |
| 6,087,755 A * | 7/2000 | Suzuki et al. ................ 310/254 |
| 6,140,726 A * | 10/2000 | Suzuki et al. ................. 310/89 |
| 6,335,582 B1 * | 1/2002 | Abukawa et al. ............ 310/214 |
| 6,380,658 B1 | 4/2002 | Sebastian et al. ........... 310/261 |
| 6,437,526 B1 | 8/2002 | Derouane et al. ........... 318/254 |
| 6,465,975 B1 | 10/2002 | Naidu ......................... 318/430 |
| 6,527,091 B1 | 3/2003 | Klode ......................... 188/164 |
| 6,566,829 B1 | 5/2003 | Naidu et al. ................. 318/432 |
| 6,577,097 B1 | 6/2003 | Krefta et al. ................ 318/801 |

FOREIGN PATENT DOCUMENTS

JP    405328656 A  * 12/1993   ................... 310/43

* cited by examiner

*Primary Examiner*—Peter Vo
*Assistant Examiner*—Livius Cazan
(74) *Attorney, Agent, or Firm*—Jimmy L. Funke

(57) ABSTRACT

A process for preparing an over molded motor stator structure comprises constructing a bobbin assembly; constructing an intermediate stator assembly including assembling the bobbin assembly to a stator core having an internal and external diameter; disposing the intermediate stator assembly into a mold fixture comprising a cover half and an ejector half that includes an inner ejector core and a moveable plate; loading a bearing carrier into the mold fixture; closing the cover half causing the moveable plate to travel within the mold; injecting a unitizing material into the mold fixture to encapsulate the intermediate stator assembly and form an over molded motor stator structure. The moveable plate travels within the mold fixture so as prevent coating of the stator laminations external diameter. A tight tolerance relationship between the inner ejector core and the stator lamination inner diameter prevents the internal diameter from being encapsulated by the unitizing material.

20 Claims, 8 Drawing Sheets

PROCESS FOR PREPARING AN OVER MOLDED MOTOR STATOR STRUCTURE

CROSS-REFERENCE TO RELATED APPLICATIONS

The present application claims priority to U.S. Provisional Application No. 60/402,457 of Eric P. Worden, et al., filed Aug. 9, 2002, entitled "Over molded motor," which is hereby incorporated by reference herein in its entirety and further claims priority to U.S. Provisional Patent Application Ser. No. 60/402,221 of Eric P. Worden, et al., filed Aug. 9, 2002, entitled "Over molded motor," which is also hereby incorporated by reference herein in its entirety.

TECHNICAL FIELD

The present invention relates to over molded motors and more particularly relates to a process for preparing an over molded motor stator structure having the internal and external stator lamination diameters exposed.

BACKGROUND OF THE INVENTION

An example of a conventional molded motor is described in U.S. Pat. No. 6,002,185 to Nakao, et al. The conventional molded motor described in U.S. Pat. No. 6,002,185 includes a stator, a rotor rotatably disposed inside the stator, bearings disposed at both ends of the rotor to support the rotor so that it can rotate freely, and a molded main body which covers the stator laminations. The stator includes a stator core laminated from a plurality of layers of cold-rolled steel plate, which is a ferrous material; stator coils composed of lead wires wound around tooth portions of the stator core, a first guide and second guide which fit into the stator core from the top and bottom respectively to insulate between the stator coils and the stator core, and a terminal fixed by heat crimping to the second guide and connected to the stator coils. The rotor is provided with a shaft supported at both ends by the bearings so that it can rotate freely and magnets fixed to the shaft with adhesive, arranged with alternating north-seeking (N) poles and south-seeking (S) poles. The molded main body has a connector portion, flange portions integrated with bushes into which bolts are inserted, and a receiving portion which receives an annulus, which is an inserted body. The molded motor is connected by means of bolts inserted into the bushes to a throttle valve device, which regulates the amount of air delivered to an internal combustion engine. In the molded motor of the above construction, an integrated motor main body is formed from the stator, the molded main body, and a bushing by injection molding in which a resin is injected into a metal mold in which the stator and the bushing have been placed. Then the bearing, which is secured to the shaft, is inserted into the bushing and the motor main body and the rotor are integrated, completing the assembly of the molded motor. The disclosure of the foregoing is incorporated by reference herein in its entirety.

In conventional processes for fabricating over molded motors, the motor main body is formed by injecting high-temperature resin into a metal mold. There are, however, disadvantages to current over molded assemblies which render the assemblies unsuitable for certain applications. One of the problems encountered with current over molded motors is that the molded main body plastic is disposed around the entire outside diameter of the stator laminations thereby insulating the motor and holding in heat. Another problem is encountered because the air gap between the rotor magnet and the motor stator laminations inside diameter needs to be very small for optimum performance. Flash resulting from the injection molding process along the inside diameter of the motor stator laminations restricts the motion of the rotor. If plastic were molded over the inside diameter of the stator laminations on purpose, it would reduce performance due to an increased air gap. Yet another drawback to currently available over molded motors relates to difficulties encountered when locating the motor within the metal housing. Plastic molded over the outside diameter reduces heat transfer out of the motor to the metal housing.

What is needed in the art is an improved process for fabricating an over molded motor stator structure. What is further needed in the art is an improved process for fabricating an over molded motor stator structure which can provide improved thermal transfer and thus heat dissipation as compared to currently available injection molded motors.

SUMMARY OF THE INVENTION

The above and other drawbacks and disadvantages of the prior art are overcome or alleviated by the present process for preparing an over molded motor stator structure having exposed inner and outer diameters comprising:

constructing a bobbin assembly around which a coil is wound;

constructing an intermediate stator assembly including asembling the bobbin assembly to a stator core comprising a plurality of stator laminations having an internal diameter and an external diameter;

disposing the intermediate stator assembly into a mold fixture comprising a cover half and an ejector half that includes an internal cavity for receiving the intermediate stator assembly, an inner ejector core, and a moveable plate;

loading a bearing carrier into the mold fixture;

closing the cover half over the ejector half of the mold thereby causing the moveable plate to travel within the mold;

injecting a unitizing material into the mold fixture to encapsulate the intermediate stator assembly and form an over molded motor stator structure including a unitized stator assembly and a molded main body;

the moveable plate traveling within the mold fixture so as to allow the unitizing material to only fill selected areas and achieve an over molded motor stator structure wherein the internal diameter and the external diameter of the stator laminations is exposed. As defined herein, the term "exposed" internal diameter and external diameter of the unitized stator means that the internal and external diameter is not covered or encapsulated by the unitizing material.

The present over molded motor stator structure advantageously provides an exposed inside stator lamination diameter therefore having little or no flash to restrict rotation of the rotor. The present over molding process further disposes no plastic on the outside diameter of the motor stator laminations. The motor stator laminations thus exposed enable enhanced heat transfer from the motor stator outside diameter to a metal motor housing, which is particularly advantageous for motors requiring dissipation of large quantities of heat. Additionally, since the present over molded motor stator structure provides for the outside diameter of the stator laminations to be exposed, and since the outside diameter of the stator laminations are held to a tighter tolerance than plastic injection moldings, the motor can be located more precisely and concentric to the metal housing.

This is particularly advantageous for controlling gear lash in an actuator and for controlling concentricity of the rotor.

These and other features and advantages of the invention will be more fully understood from the following description of certain specific embodiments of the invention taken together with the accompanying drawings.

BRIEF DESCRIPTION OF THE DRAWINGS

Referring now to the drawings, which are meant to be exemplary, not limiting, and wherein like elements are numbered alike in the several FIGURES.

DESCRIPTION OF THE PREFERRED EMBODIMENT

Turning now to the figures, FIGS. 1–4 show a metal mold 10 used for preparing an over molded motor stator structure having the stator laminations exposed at their external diameter and internal diameter in accordance with the present invention. While the invention is particularly suitable for use in a motor application for an actuator, it is also applicable to other motor types including, but not limited to, throttle body motors.

Figure 1:
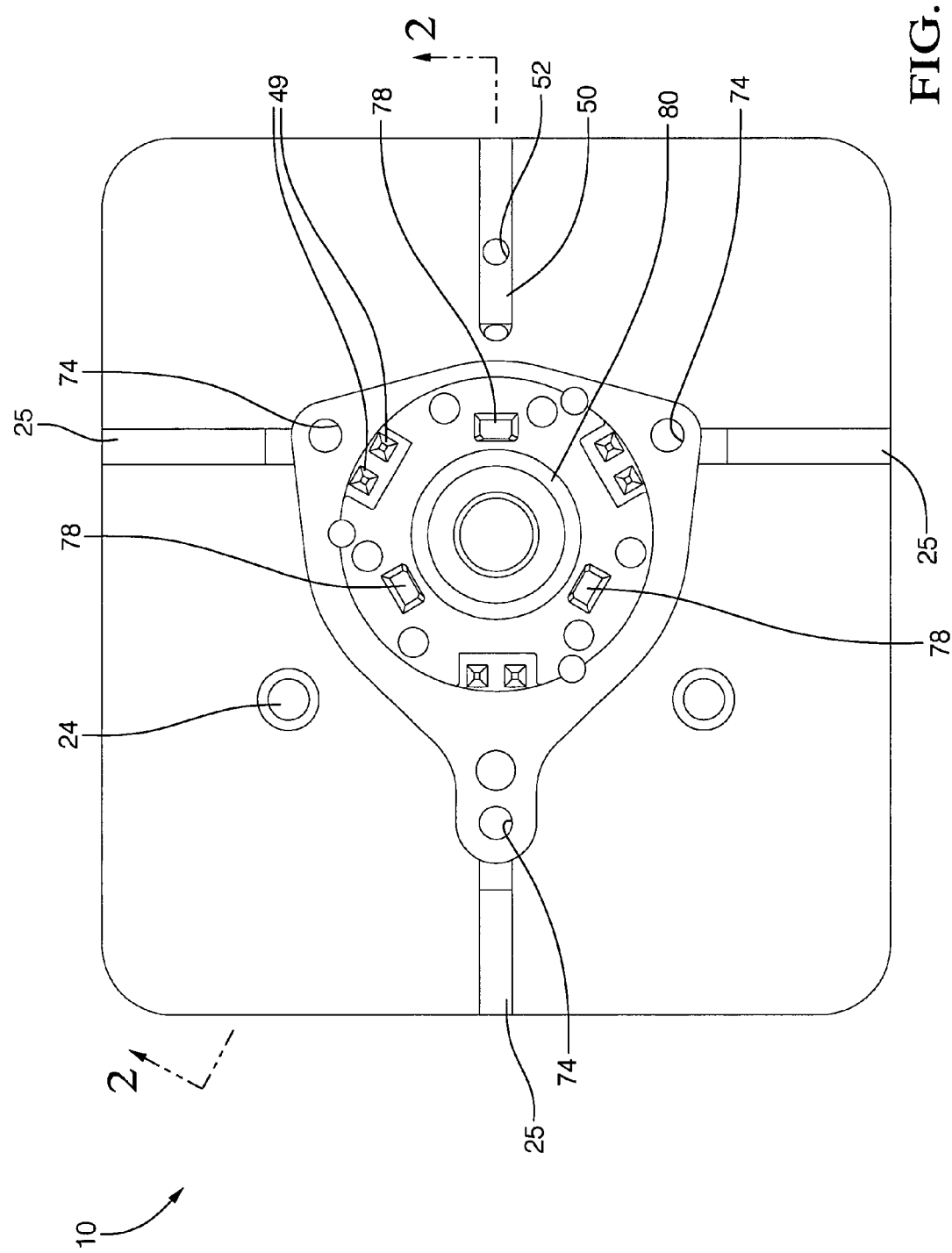
FIG. 1 is a top view of an ejector half of a metal mold and unitized stator assembly after molding for preparing the over molded motor stator structure in accordance with the present invention.
Figure 2:
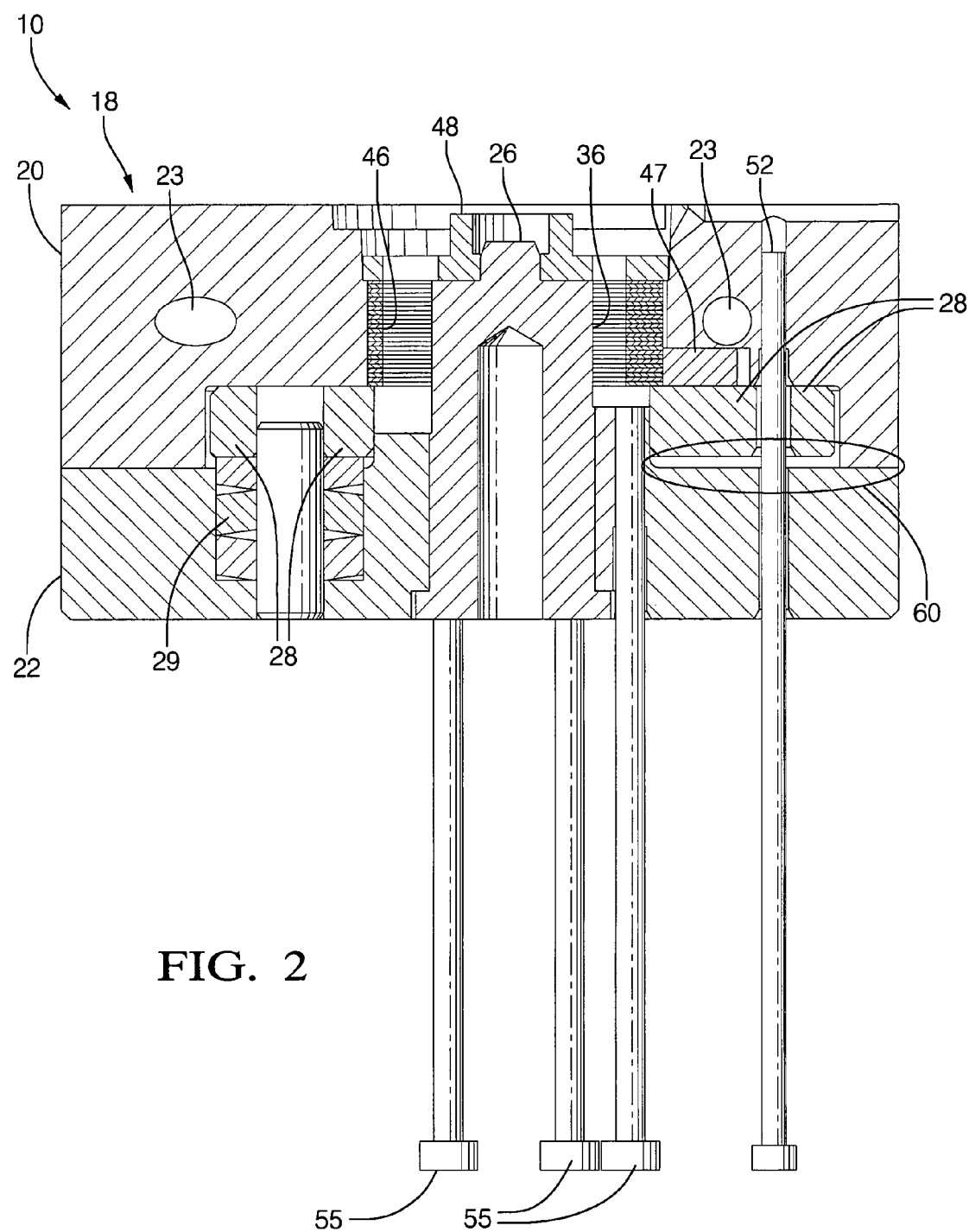
FIG. 2 is a cross-section taken along the line 2—2 of FIG. 1 of the ejector half of the metal mold used for preparing the over molded motor stator structure prior to molding.
Figure 3:
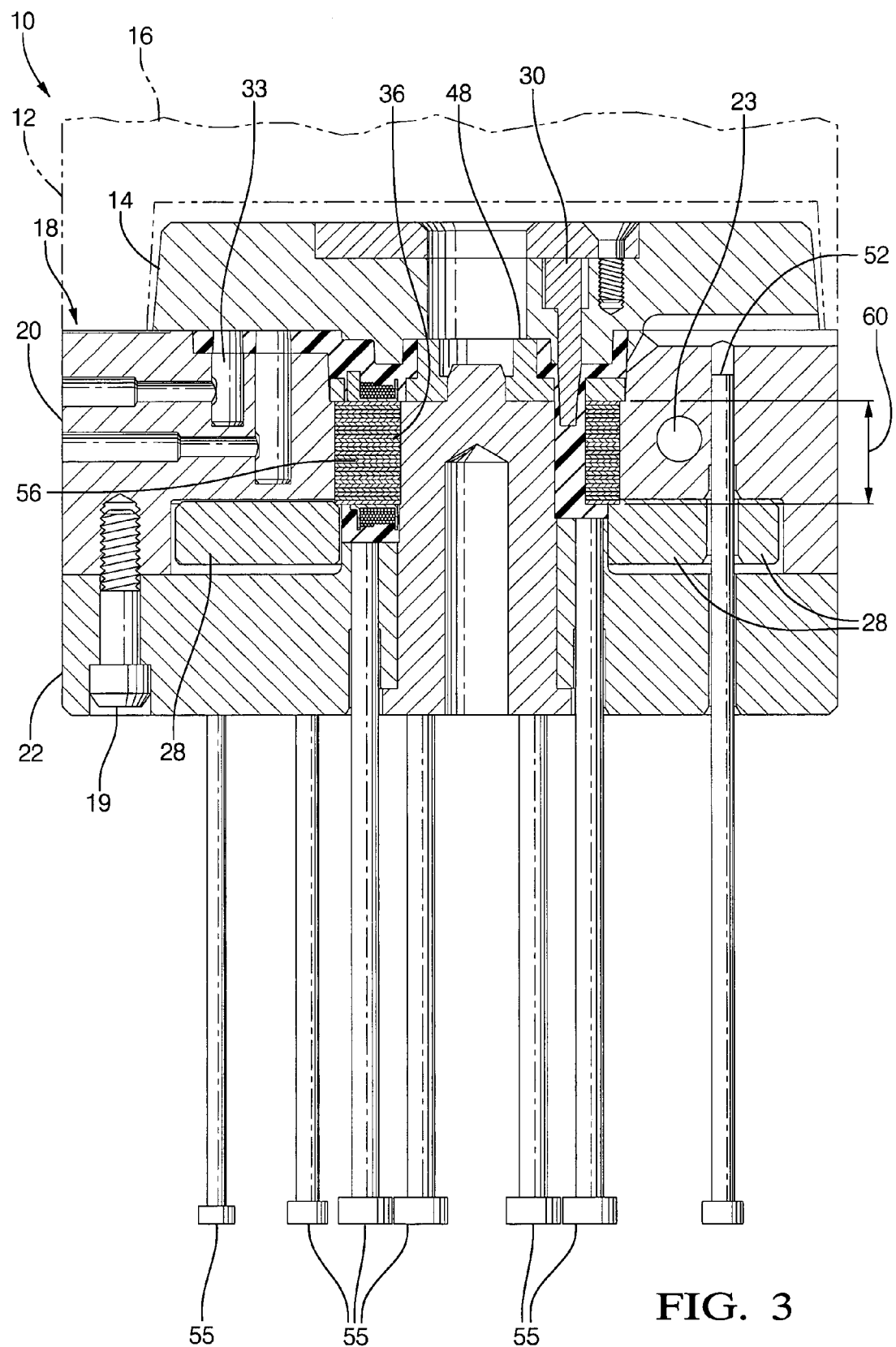
FIG. 3 is a cross-sectional view of a cover half disposed over the ejector half of the mold showing the unitized stator after molding in accordance with the present invention.
Figure 4:
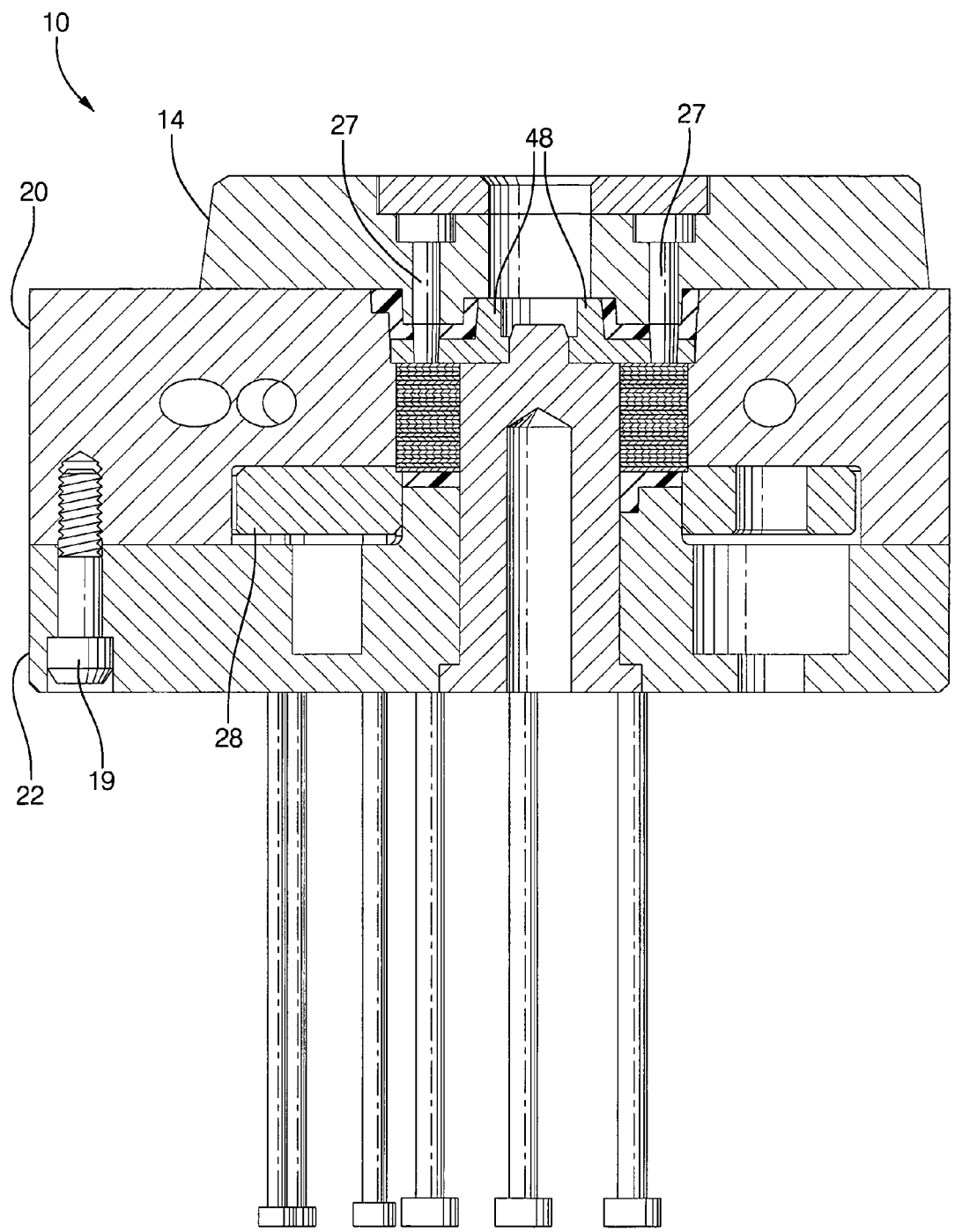
FIG. 4 is another cross-sectional view of the metal mold in accordance with the present invention comprising a cover half disposed over the ejector half of the mold showing load carrying pins.

The metal mold 10 includes a cover half 12 and an ejector half 18. The cover half 12 includes an inner cover insert 14 and an outer cover portion 16. The ejector half 18 includes an upper portion 20 and a bottom portion 22. FIG. 1 shows a top view of the ejector half of the mold 10 after molding. FIG. 2 shows a cross-section taken along the line 2—2 of FIG. 1 of the ejector half 18 of the metal mold 10 prior to molding. FIG. 3 shows a cross-section of the cover half 12 and ejector half 18 of the mold 10 after molding. FIG. 4 shows a cross-section of the cover half 12 and ejector half 18 of the mold 10 prior to molding.

The mold 10 is formed of a metal, typically S-7 steel with a hardness of 52 to 54 $R_c$. Typically the upper and lower portions 20, 22 of the ejector half of the mold 10 are screwed and doweled into location via screws 19 and dowel pins (not shown). The top side of the upper portion 20 of the ejector half 18 shown in FIG. 1 includes vents 25. The cover insert 14 includes load carrying pins 27 (shown in FIG. 4) to transfer loads from the closing press to the top of unitized stator assembly 56 laminations 38. The upper portion 20 of the ejector half 18 includes water lines 23. An inner ejector core 26 is inserted into the lower portion 22 of the ejector half of the mold to form the central cylindrical bore 36 (the larger outer diameter of the ejector core 26 matches the stator laminations inside diameter $D_2$. The inner ejector core 26 also has a smaller concentric diameter that is used to locate the inserted bearing carrier 48. The inner ejector core 26 is secured in registry with the upper portion 20 and lower portion 22 of the ejector half 18 of the mold 10 so as to insure proper alignment of the central bore 36 within the unitized stator assembly 56. Moveable plate 28 is disposed within the upper portion 20 of the ejector half 18 of the mold 10.

The upper portion 20 and moveable plate 28 are shaped to accept the particular stator dimensions. The inner cover insert 14 and cover plate 16 may comprise a single unit or two separate units. In a preferred embodiment, the inner cover insert 14 and the outer cover portion 16 comprise two discrete units and the inner cover insert 14 is disposed manually over the ejector half 18 of the mold 10 so as to ensure that electrical terminals 49 (FIGS. 6 through 11) are not harmed during placement. The inner cover insert 14 includes means 30 for forming sensor cavities such as the three sensor cavities 78 and terminal openings (not shown) such as to accept the six electrical terminals 49 and insure that the unitizing material does not cover the connecting ends of the terminals. Motor mounting forming features 33 provide means for integral formation of motor mounting features 74 (FIGS. 8–12) in the molded main body 58.

Figure 5:
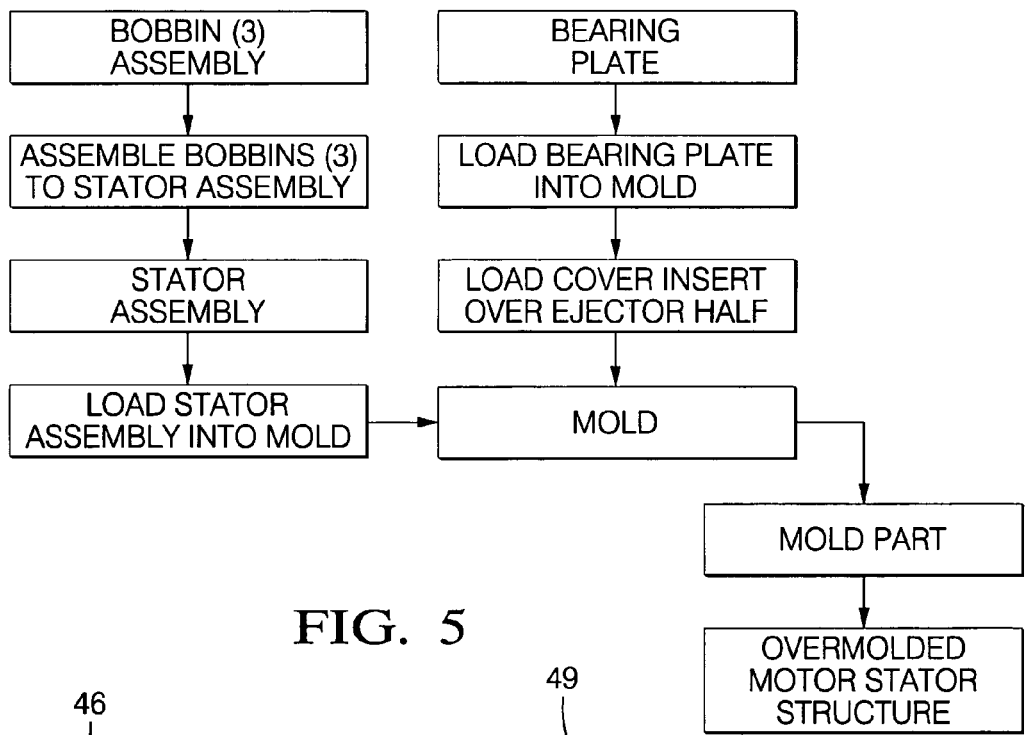
FIG. 5 is a process flow diagram showing selected steps of the present invention for preparing an over molded motor stator structure.
Figure 6:
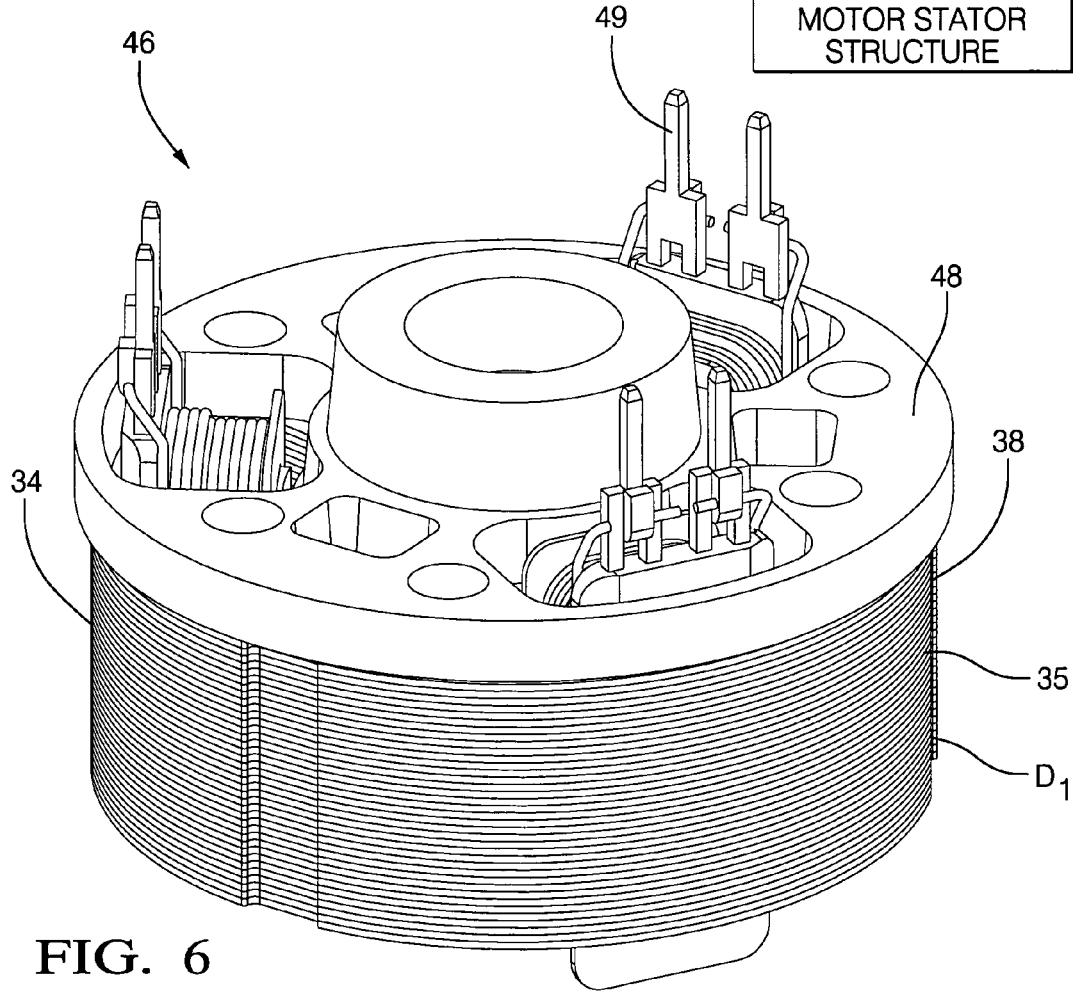
FIG. 6 is a perspective view of an intermediate stator assembly prior to disposing into the mold fixture.
Figure 7:
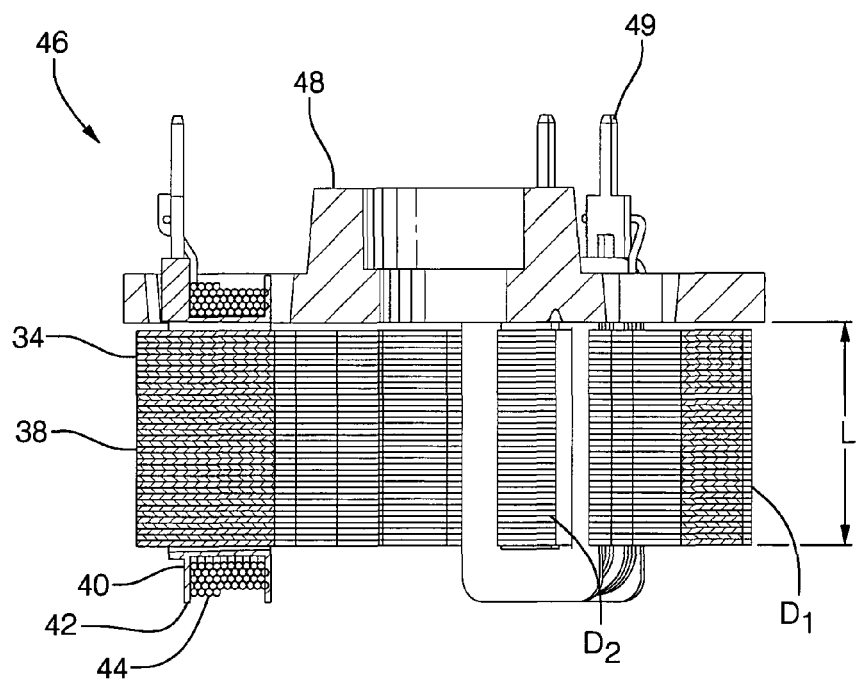
FIG. 7 is a sectional view of the intermediate stator assembly of FIG. 6 prior to disposing into the ejector half of the mold fixture.
Figure 8:
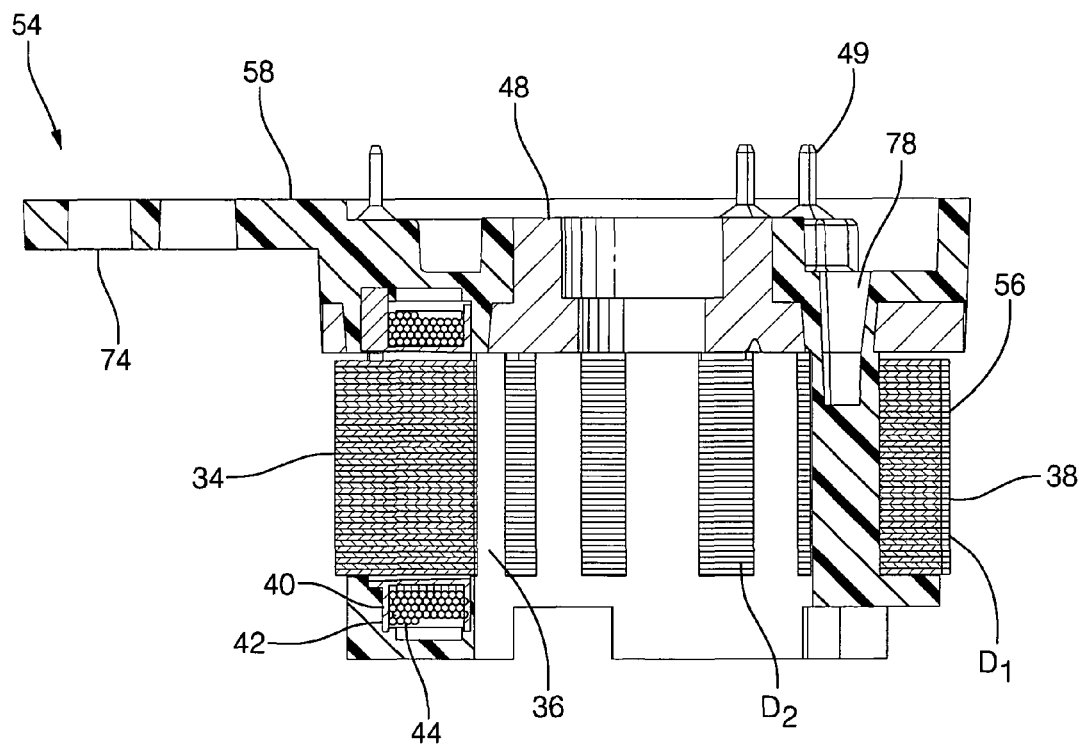
FIG. 8 is a cross-section of an over molded motor stator structure prepared in accordance with the present invention showing the stator laminations exposed internally and externally.
Figure 9:
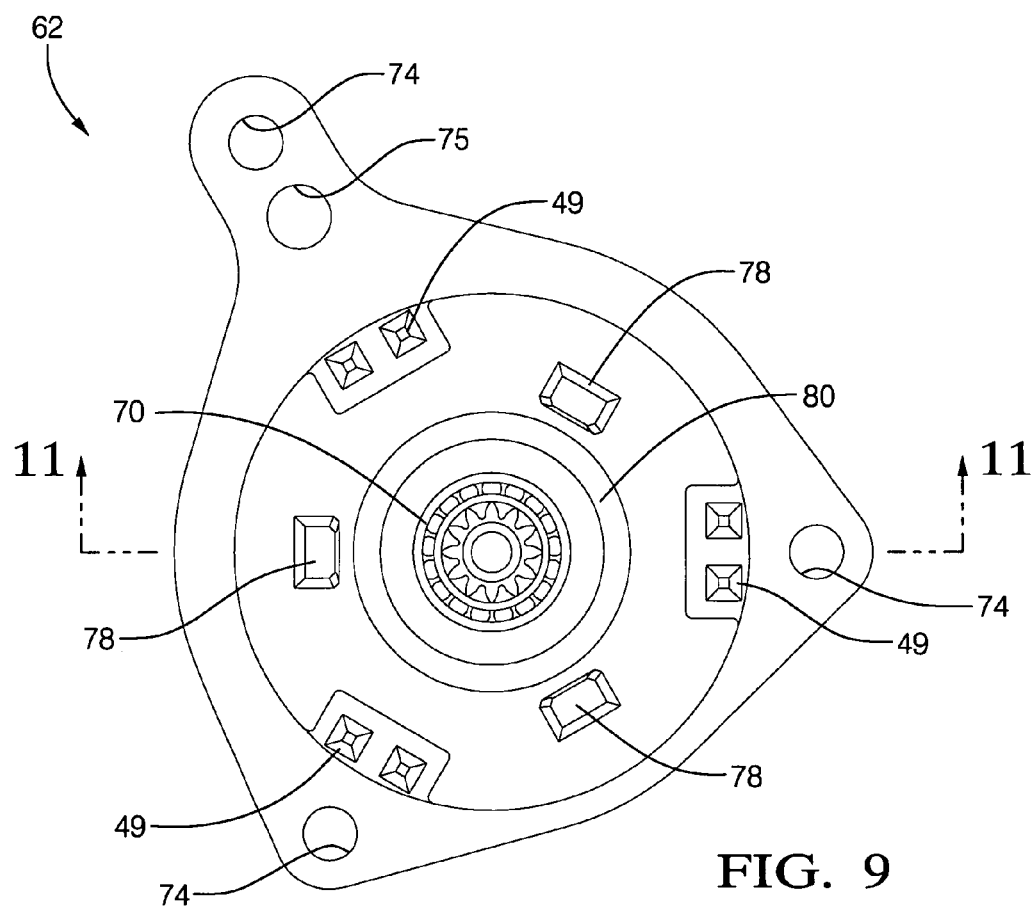
FIG. 9 is a top view of an over molded motor prepared in accordance with the present invention.
Figure 10:
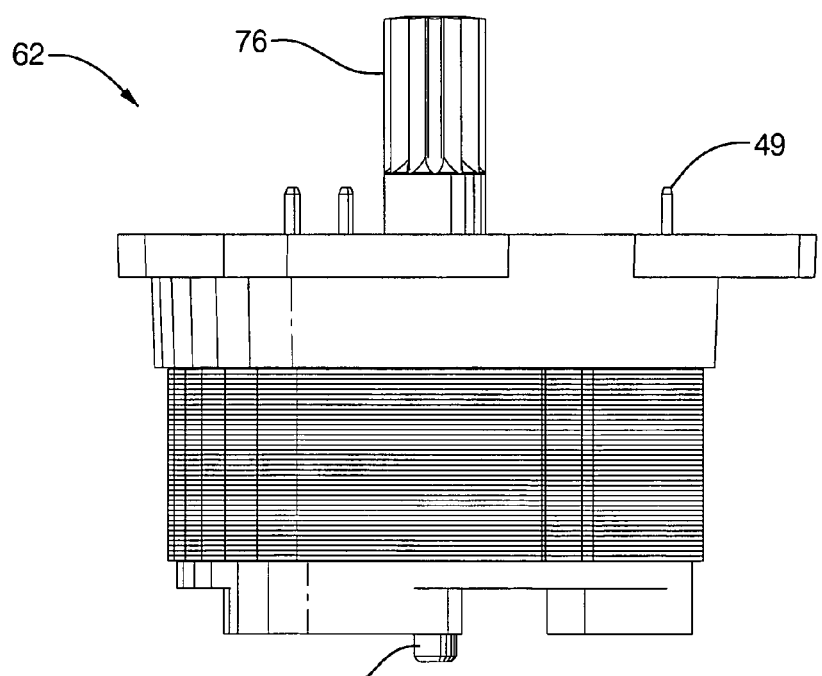
FIG. 10 is a side view of an over molded motor prepared in accordance with the present invention.
Figure 11:
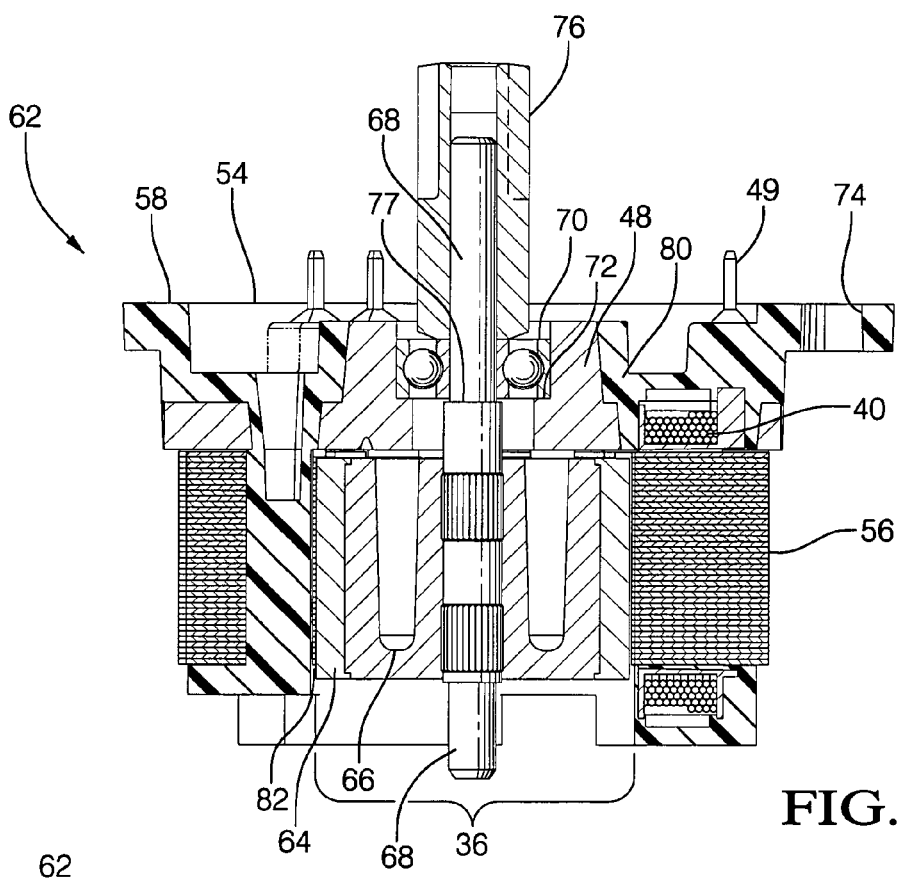
FIG. 11 is cross-sectional view taken along the line 11—11 of FIG. 9.
Figure 12:
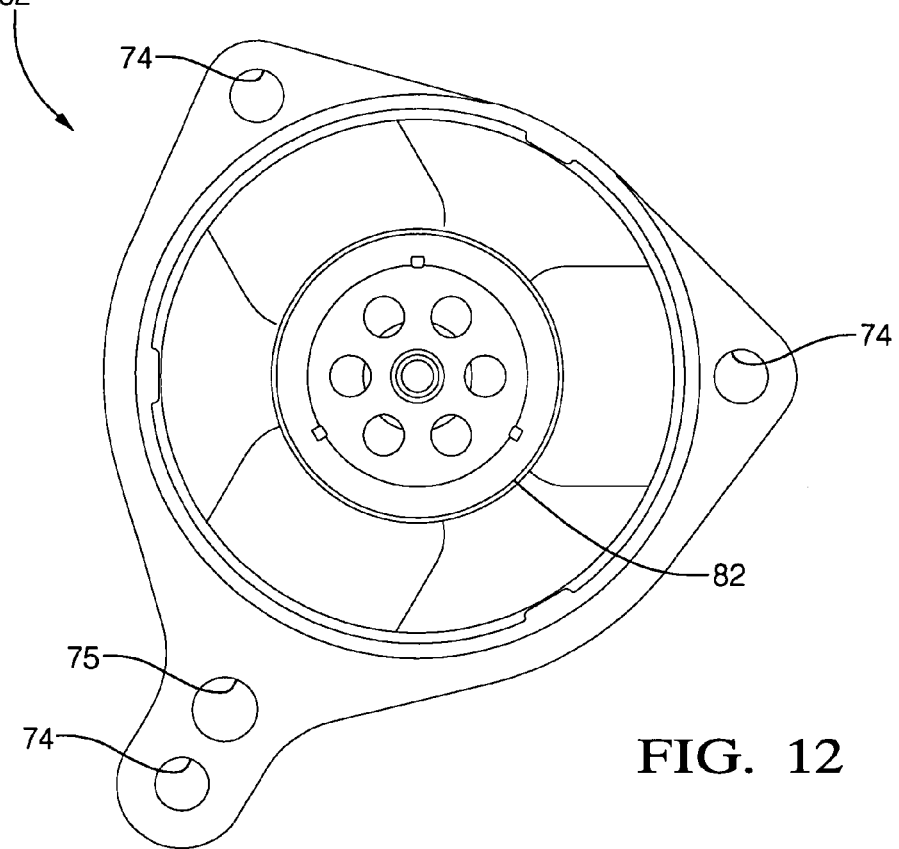
FIG. 12 is a bottom view of an over molded motor prepared in accordance with the present invention.

FIG. 5 shows a flow chart outlining the present process for preparing the over molded motor stator structure. As best shown in FIGS. 6 through 8 and 11, the stator 34 has a length L, an external diameter $D_1$, an internal diameter $D_2$, and a central bore 36 extending along the length L of the stator 34 for housing a rotor assembly. The stator 34 generally includes a plurality of steel plates 38 stacked in alignment with one another forming a stator core 35. The steel plates 38 may be initially secured by lamination or other means such as by weld joints prior to unitizing. A coil assembly 40 including a bobbin 42 around which a magnet wire coil 44 is wound is assembled to the stator 34 to form an intermediate stator assembly 46 (that is, a pre-unitized stator assembly).

In the process for preparing the over molded motor stator structure 54, a bobbin assembly 40 is prepared by winding a magnet wire coil 44 around a bobbin 42. Three bobbin assemblies 40 are disposed onto the tooth portions of the stator 34 to provide the intermediate stator assembly 46. The intermediate stator assembly 46 is disposed into the ejector half 18 of the mold 10 which includes the moveable plate 28 and key feature 47 for positioning the intermediate stator assembly 46. The bearing carrier 48 is then loaded into the mold.

The inner cover insert 14 is disposed manually over the ejector half 18 of the mold 10 and then the outer cover portion 16 is disposed over the both the inner cover insert 14 and the ejector half 18 of the mold 10 thereby causing the moveable plate to travel to such a position that the unitizing material will fill only into desired areas and not fill into unwanted areas.

The ejector half 18 of the mold 10 includes runner 50 and runner ejector pin 52. A unitizing material is injected into the mold fixture through the runner 50 under pressure so as to encapsulate the intermediate stator assembly 46, further secure the plurality of stacked steel plates 38, and form an over molded motor stator structure 54 comprising a unitized stator assembly 56 and a molded main body 58.

Prior to the unitizing material being urged into the mold, the moveable plate 28 travels within the ejector half 18 of the mold 10 and shuts off the flow of the unitizing material at the bottom of the stator 34 (during closing of the mold) so as to achieve an over molded motor stator structure 54 having the internal diameter $D_2$ and external diameter $D_1$ of the unitized stator assembly 56 laminations 38 exposed. That is, the internal diameter $D_2$ and external diameter $D_1$ of the stator laminations 38 are not covered with plastic.

The moveable plate 28 travels a distance up and down the length of the ejector half 18 of the mold 10 sufficient to compensate for any variation in lamination stack height (area of moveable plate travel indicated by circle 60 in FIG. 2). The moveable plate 28 may travel, for example, up to about 1.0 millimeter. The moveable plate 28 is moved by a force greater than or equal to the force generated by the pressure required to fill the mold cavity completely acting on the surface area of the plastic. The moveable plate 28 sits on top of springs 29 that allow it to move up and down relative to the changing height of stators 34 due to stator height tolerance. The springs 29 located under the moveable plate 28 provide the necessary force needed to shut off plastic flow and keep it from coating external diameter $D_1$. The internal diameter $D_2$ is kept free of over molded plastic by the tight fit of the inner ejector core 26 to the internal diameter $D_2$ of the stator laminations 34. If desired, alternate means may be employed including, but not limited to, more complex systems such as hydraulic cylinders.

The terms "unitizing material" and "plastic" as used herein refer to any thermoplastically processible resin, or blend of such resins. The thermoplastically processible resin or blend may optionally include additives such as flame retardants, reinforcements, colored pigments, fillers, plasticizers, heat or light stabilizers. Examples of suitable thermoplastic resins include, but are not limited to, polybutylene terephthalate resin, 6, 6-polyamide, 6-polyamide, 4,6-polyamide, 12, 12-polyamide, 6,12-polyamide, and polyamides containing aromatic monomers, polyethylene terephthalate, polyethylene napththalate, polybutylene napththalate, aromatic polyesters, liquid crystal polymers, polycyclohexane dimethylol terephthalate, copolyetheresters, polyphenylene sulfide, polyacyclics, polypropylene, polyethylene, polyacetals, polymethylpentene, polyetherimides, polycarbonate, polysulfone, polyethersulfone, polyphenylene oxide, polystyrene, styrene copolymer, mixtures and graft copolymers of styrene and rubber, and glass reinforced or impact modified versions of such resins. Blends of these resins such as polyphenylene oxide and polyamide blends, and polycarbonate and polybutylene terephthalate may also be used. In a preferred embodiment, the unitizing material comprises a 30% mineral filled polybutylene terephthalate based on the total weight of the resin composition.

The unitizing material is allowed to cool and solidify, the mold is opened, and the over molded motor stator structure 54 is removed from the ejector half 18 of the mold 10 with aid of part ejector pins 55.

It is an advantageous feature of the present invention that the over molded stator structure 54 is used as molded and does not require additional machining. While machining is not required, after separating the over molded motor stator structure 54 from the mold fixture 10, portions of the unitizing material may be machined if desired to finish the unitized stator 56 and molded main body 58 portions. Any number of machining techniques as known in the art can be used to form or finish the central bore 36, motor mounting features 74, or other features, including boring, grinding, broaching, honing or lapping.

As shown in several views in FIGS. 9–12, a completed over molded motor 62 is prepared by joining a rotor assembly 64 with the present over molded motor stator structure 54. For example, the rotor assembly 64 having a central rotor portion 66 on a rotor shaft 68 is assembled into the over molded motor stator structure 54 by insertion into the continuous central bore 36 formed in the unitized stator assembly 56 through the lamination stack 38. The rotor assembly 64 is rotatably secured by rotor bearing 70. The main motor body 58 preferably includes integral rotor bearing mounting features 72 (which are part of the bearing carrier 48) for receiving the rotor bearing 70 and gear shaft clearance hole 75. The rotor assembly 64 is then carried within the central bore 36 by engagement between the rotor bearings 70 and the rotor shaft 68. The main rotor body is secured longitudinally by press fitting a pinion gear 76 over one end of the shaft 68 capturing the bearing 70 between the shaft shoulder 77 and the bottom of the pinion gear 76. Another rotor bearing (not shown) is in the bottom of the motor housing (not shown) into which the over molded motor 62 is inserted.

The rotor can be magnetized in any fashion using methods known to those skilled in the art. The main motor body 58 preferably further includes motor mounting features 74 for mounting the over molded motor 62 to the motor housing, allowing the motor pinion gear 76 to appropriately engage the apparatus which it drives. In order to preserve clarity and to focus on the over molded motor stator structure aspect of the present invention, additional details of the completed motor readily known to those skilled in the art are not shown in the drawings.

The present over molded motor stator structure provides advantages including, but not limited to: (1) the coil wires 44 are held in place allowing them to survive even in a severe vibration environment; (2) the motor mounting features 74 are integrated into the plastic over mold (main body 58) making fewer motor components necessary to effect the mounting of the over molded motor 62 to the actuator (not shown) or other apparatus which it drives; (3) the sensor cavities 78 in the over molded motor main body 58 (extending into the motor stator) are molded in place to guide the assembly of feedback sensors (not shown) or other parts to the motor assembly; (4) the over molded main body 58 includes a bearing pocket support 80 to support the metallic bearing pocket or bushing which is included as part of bearing carrier 48; and (5) the air gap 82 between the rotor assembly 64 outside diameter and the motor stator laminations inside diameter $D_2$ is very small (less than about 0.5 mm). Additional features such as end caps, etc., may also be formed as integral parts of the molded main body 58.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A process for preparing an over molded motor stator structure comprising:
   constructing a bobbin assembly around which a coil is wound;
   constructing an intermediate stator assembly including assembling said bobbin assembly to a stator core comprising a plurality of stator laminations having an internal diameter and an external diameter;
   disposing said intermediate stator assembly into a mold fixture comprising a cover half and an ejector half that includes a first portion, a second portion, an internal cavity inserted into said second portion for receiving the intermediate stator assembly, an inner ejector core, within said first portion and a moveable plate;
   loading a bearing carrier into said ejector half fixture;
   closing said cover half over said ejector half of said thereby causing said moveable plate to travel within said mold;
   injecting a unitizing material into said mold fixture to partially encapsulate said intermediate stator assembly and form an over molded motor stator structure including a unitized stator assembly having a central bore and a molded main body;
   said moveable plate traveling within said ejector half so as to allow said unitizing material to only fill selected areas and achieve an over molded motor stator structure such that the internal diameter and the external diameter of said stator laminations is not covered in unitizing material after molding.

2. The process of claim 1, wherein said moveable plate is spring loaded.

3. The process of claim 1, wherein said mold fixture includes means for forming sensor cavities.

4. The process of claim 1, wherein said mold fixture includes means for forming integral motor mounting features.

5. The process of claim 1, wherein said cover half comprises an inner cover insert and an outer cover portion.

6. The process of claim 5, wherein said inner cover insert and said outer cover portion comprise two discrete units.

7. The process of claim 6, wherein said inner cover insert is manually disposed over said ejector half of said mold.

8. The process of claim 5, wherein said inner cover insert and said outer cover portion comprise a single integral unit.

9. The process of claim 1, wherein said over molded stator structure is suitable for use as molded without requiring additional machining processes.

10. The process of claim 1, wherein said molded main body includes a bearing pocket support.

11. A process for preparing an over molded motor comprising:
    constructing a rotor assembly on a rotor shaft, said rotor assembly being adapted for support by bearings located near end portions of said rotor shaft;
    performing the process of claim 1 to obtain an over molded motor stator structure, and
    rotatably disposing said rotor assembly into said over molded motor stator structure by inserting said rotor assembly into said central bore of said over molded motor stator structure.

12. The process of claim 11, wherein said moveable plate is spring loaded.

13. The process of claim 11, wherein said mold fixture includes means for forming sensor cavities.

14. The process of claim 11, wherein said mold fixture includes means for forming integral motor mounting features.

15. The process of claim 11, wherein said cover half comprises an inner cover insert and an outer cover portion.

16. The process of claim 15, wherein said inner cover insert and said outer cover portion comprise two discrete units.

17. The process of claim 16, wherein said inner cover insert is manually disposed over said ejector half of said mold.

18. The process of claim 15, wherein said inner cover insert and said outer cover portion comprise a single integral unit.

19. The process of claim 11, wherein said over molded stator structure is suitable for use as molded without requiring additional machining processes.

20. The process of claim 11, wherein said molded main body includes a bearing pocket support.

* * * * *